June 26, 1928.
H. J. BURNS ET AL
PNEUMATIC CONVEYER
Filed June 25, 1923
1,675,090
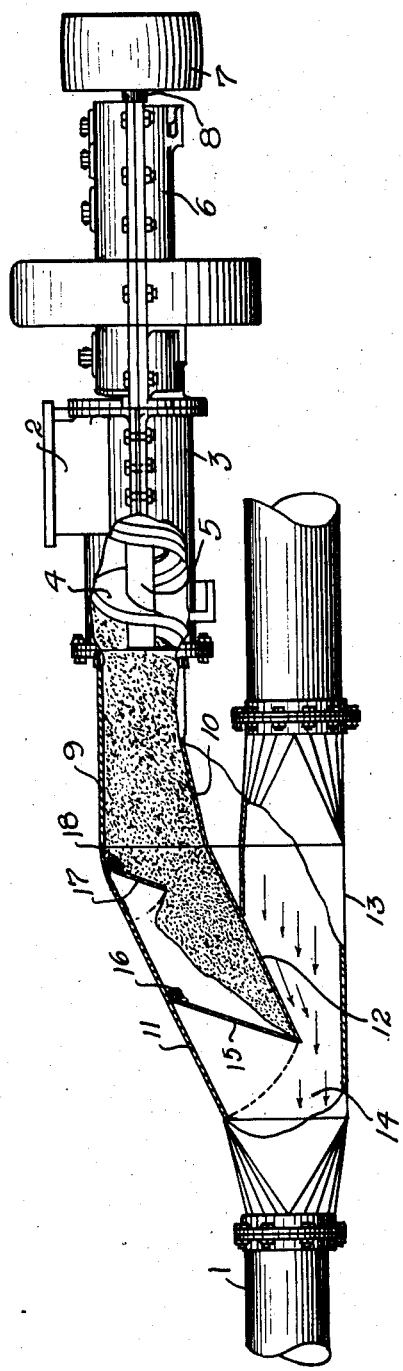
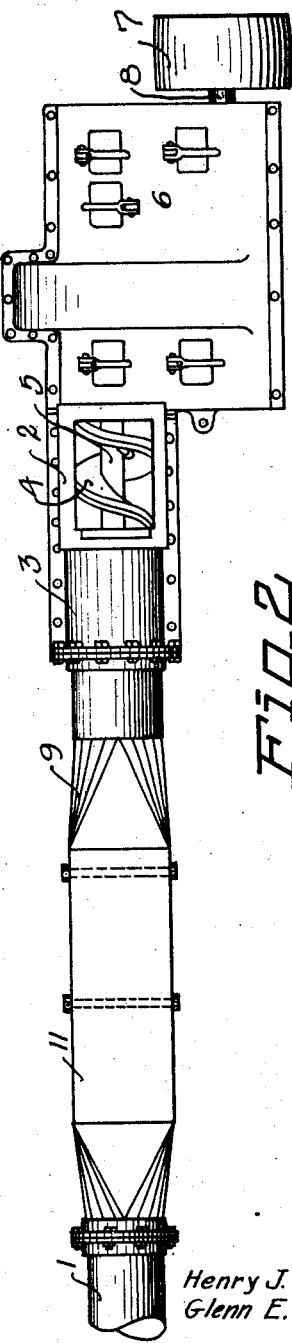
Inventors
Henry J. Burns
Glenn E. Tollenaar Patented June 26, 1928.

1,675,090

UNITED STATES PATENT OFFICE.

HENRY J. BURNS AND GLENN E. TOLLENAAR, OF SPOKANE, WASHINGTON.

PNEUMATIC CONVEYER.

Application filed June 25, 1923. Serial No. 647,623.

Our present invention relates to improvements in pneumatic conveyers for use in dust collecting systems of industrial plants for removal of dust, chips, shavings, and other refuse produced by the operations of machinery within the plant. The invention embodies the utilization of the injector method, which avoids passage of the material through the fan or blower, and consists in certain novel combinations and arrangements of parts between the mechanical feed device for the material and the main conveyer pipe of the pneumatic collecting system. The system, which is adapted for removal of light materials from an industrial plant to clear the atmosphere of injurious dust etc., includes a number of these injecting or feeding devices in connection with the main conveyer pipe, only one of which is here illustrated and described.

The primary object of the invention is the provision of means whereby a constant and uniform feed of material may be maintained through the pneumatic conveyer or main pipe while the system is in operation, thus eliminating the possibility of choking the passage through the main pipe. Back pressure of air or the movement of air currents from the conveyer pipe toward the mechanical feed device or injector is prevented thus insuring the maximum utility for the air pressure with a minimum waste of the air pressure. Thus the efficiency of the collecting system is enhanced and the expense of maintenance is reduced. To this end the invention consists essentially in the embodiment of a pocket for the injector located between the mechanical feed device and the main pipe or pneumatic conveyer for the reception and retention of a sufficient quantity of the material to form a closure or barrier against movement of back currents from the conveyer toward the feed device, and at the same time permits concentration of the air blast against the material drawn from the injector. The injector which is automatically actuated by suction, co-acts with the blast in the main pipe to force and convey the material with constancy and uniformity. By this means the dust or other material is conveyed through the main pipe, and additional quantities of dust supplied thereto with uniformity and constancy at each injector device, resulting in a simple, compact and efficient system for the purpose intended.

In the accompanying drawings we have illustrated one complete example of the physical embodiment of our invention wherein the parts are combined and arranged in accordance with the best mode we have thus far devised for the practical application of the principles of our invention, and which has proven highly successful in the performance of its required functions.

Figure 1 is a view in side elevation showing a portion of the main pneumatic conveyer pipe of the dust collecting system, the injector and a portion of the pipe being shown in section for convenience of illustration.

Figure 2 is a top plan view of the machine of Fig. 1 showing one of the collecting and feed devices used in the dust collecting system of an industrial plant, as a saw mill.

The main pneumatic conveyer pipe 1 of the collecting system is connected in usual manner with the blower or fan, at one end, and leads to and conveys the dust or traveling material to the collector. From the collector the material collected may be deposited in a bin, car, cart, or otherwise disposed of in usual manner, and it will be understood that the required blast of air is maintained through the main pipe 1 as indicated by the arrows in Fig. 1.

The feed hopper 2, which is of proper size and shape is located in convenient position for access in order that saw dust, shavings, chips etc., from the operations of a plant, as for instance a saw mill, may be gathered and passed through the hopper. The hopper is mounted upon a sectional casing 3, which is cylindrical in shape and disposed horizontally above and preferably parallel with the main pipe 1. Within the casing is located a screw conveyer 4 rotatable with its supporting shaft 5 that is journaled in the bearings provided therefor in the casing and in the housing 6 extended from the casing at the right thereof.

A driving pulley 7 and its shaft 8 are shown, supported in bearings in the gear casing or housing 6, and suitable gearing is employed in the housing to transmit motion from the driven pulley and its shaft to the shaft of the screw conveyer for feeding the material, as dust, from the hopper. At the feed end of the casing an injector pipe 9 is attached as by bolts, and it will be noted that the bottom wall 10 of the injector pipe diverges from the plane of its top wall, thus increasing the capacity of the injector pipe 9 toward the main pipe 1.

At the larger end of the injector pipe a junction hood 11 is attached in suitable manner, said hood declining toward the main pipe 1 and having its upper or top wall merged with the top wall of the main pipe. The bottom wall 12 of the hood projects within the section 13 of the main pipe, with its free end terminating at the central longitudinal plane, or a little below the center, of the section 13. The pipe section 13 is rectangular in cross section, as is also the hood 11, or at least that part of the hood which merges with and passes into the pipe section. The front end of the hood which opens into the pipe section is thus of greater area than the injector pipe 9 to permit the dust passing therethrough to be lofted and expanded and more readily enter the air currents passing through the conveyer pipe. The bottom wall 12 of the hood forms a deflecting plate, as indicated by the arrows in Fig. 1 for the currents of air passing through the main pipe, and the air currents are concentrated as they are guided through the throat 14 formed in the pipe section 13 just below the end of the deflecting wall 12 of the hood.

Because of the suction due to the action of the passing air currents of the blast passing through the main pipe it will be apparent that the dust is drawn from the hood and conveyed by the air currents toward the left in Fig. 1 and deposited at the point of collection.

The spiral feed screw by its operation passes the material to be conveyed into the injector pipe 9 and hood 11 and these members form a pocket for the reception and retention of the material as it is forced and pushed to the left in Fig. 1 by the mechanical feed device. The material thus retained in the pocket formed by the hood and injector pipe forms a barrier or seal against passage of air currents from the main pipe toward the mechanical feed device, as well as against movement of air from the atmosphere to the main pipe through force of suction. Thus there is no loss of air pressure by leakage with consequent reduction in air pressure and expenditure of increased power to maintain the pressure in the main pipe, and the feed of the dust or material from the pocket is regulated and governed to insure uniformity and constancy. The barrier is maintained at all times, the supply being provided by the mechanical feed device (which is properly adjusted) in the injector pipe, and the feed of material to the main pipe being taken from the opened end of the hood within said pipe.

The feed of material from the hood or injector may be governed or regulated by the utilization of a feed gate 15 which hangs from its hinges 16 within the hood with its free edge adapted to close over the free edge of the wall 12 of the hood. The gate is closed by gravity and opened by pressure or suction through the main pipe section. An auxiliary gate or baffle plate 17 may also be hinged at 18 near the entrance opening of the hood, and is suspended to hang adjacent to the exit end of the injector pipe. By means of the latter gate the material may be backed up in the injector pipe sufficiently to insure a more densely packed condition than exists in the hood for the purpose of maintaining the barrier or supply of material to close the pocket against passage of air in either direction through the hood and injector pipe.

The gate 15 is of sufficient weight and is suspended in such manner as to normally close the injector hood, and is opened by either suction from the main pipe or mechanical pressure on the material from the feed device. The smaller baffle plate 17 which retards the progress of a portion of the material and assists in forming the closure within the injector, is swung on its hinges by pressure from the accumulated material in the injector pipe.

The use of the throat 14 in the section 13 provides a nozzle in the conveyer pipe on the venturi principle and increases the force of the draft in the conveyer pipe, causing a stronger or greater suction on the material to swing open the gate 15 and draw the material within the pipe 1.

The material itself is collected in the pocket of the injector device, and a sufficient quantity there maintained at all times and utilized to insure a barrier or dam in the injector between the mechanical feed device and the pneumatic conveyer pipe, to prevent passage of air currents to or from the conveyer pipe.

Having thus fully described our invention, what we claim as new and desire to secure by Letters Patent is:

1. The combination with a pneumatic conveyer pipe, of a hood connected therewith and formed with an inclined bottom wall projecting within said pipe, a gravity actuated, hinged gate for normally closing said hood within the pipe, an injector pipe connected with said hood, and means for feeding material to said injector pipe.

2. The combination with a pneumatic conveyer pipe, of a hood connected therewith and formed with an inclined bottom projecting within said pipe, a gravity actuated hinged gate for normally closing said hood, an injector pipe connected with said hood and a feeding device therefor, and a hinged baffle plate suspended from said hood adjacent to said injector pipe.

In testimony whereof we affix our signatures.

HENRY J. BURNS.
GLENN E. TOLLENAAR.